UNITED STATES PATENT OFFICE.

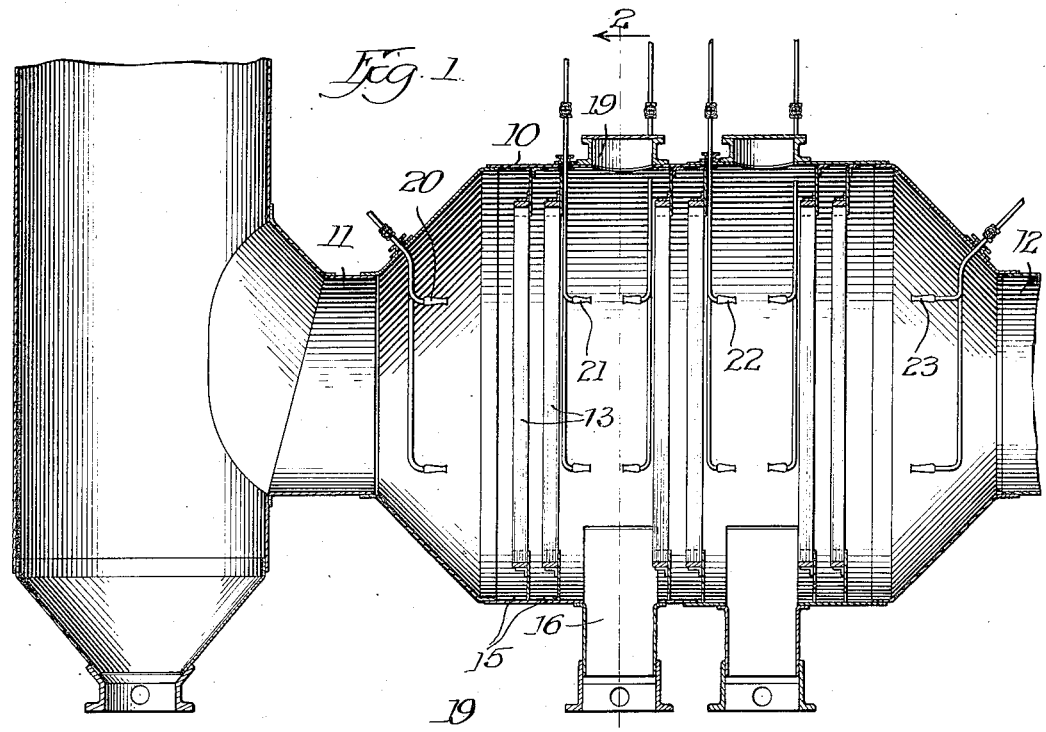
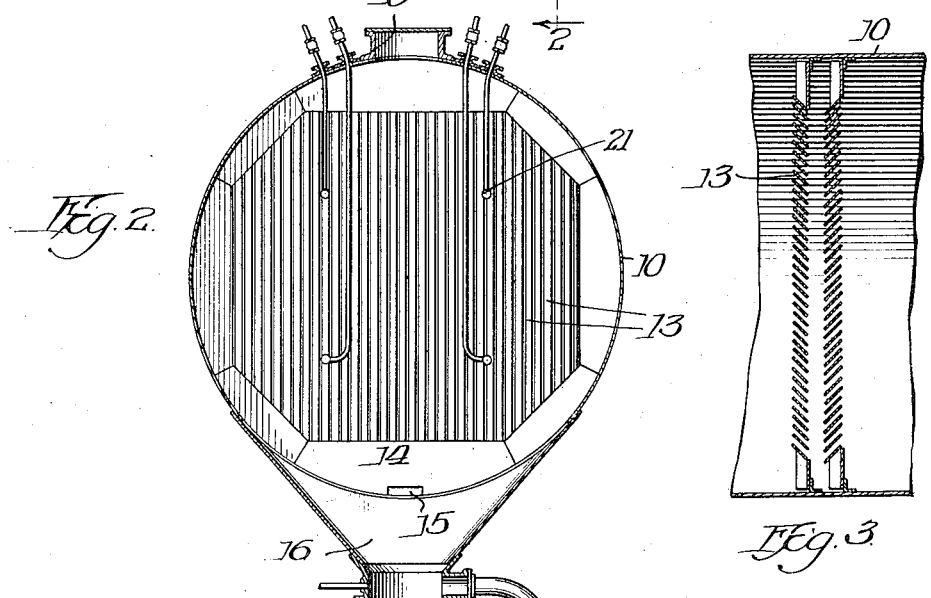

HERMANN A. BRASSERT, OF CHICAGO, ILLINOIS.

APPARATUS FOR DRYING GAS.

1,169,919.  Specification of Letters Patent.  Patented Feb. 1, 1916.

Application filed October 1, 1915. Serial No. 53,568.

*To all whom it may concern:*

Be it known that I, HERMANN A. BRASSERT, a citizen of the United States, and resident of Chicago, in the county of Cook and State of Illinois, have invented certain new and useful Improvements in Apparatus for Drying Gas, of which the following is a specification.

My invention relates generally to the process of cleaning blast furnace gas for its use as a fuel in stoves and under boilers, and specifically to produce a gas which, after being washed to eliminate its dust contents, is thoroughly dried so as to give a high calorific effect in combustion.

The washing of blast furnace gas is a well-known art, but heretofore part of the advantage gained from the cleanliness of washed gas has been lost by not having it properly dried. Many attempts have been made to accomplish the elimination of entrained moisture, such as long flues connecting the washer with the stoves and boilers where the gas was to be used; or baffles were put in the top of vertical towers, or in the vertical uptakes or down-legs connecting the gas mains with stoves and boilers; or rotary fans were used for this purpose. The long flues will eliminate only a small part of the moisture; ordinary baffles placed in the top of vertical towers will eliminate moisture, but the drops formed continue to fall back into the path of the gas, and a complete drying is prevented; fans are expensive to operate and their use should be avoided.

I have found by a large amount of experimentation that the most efficient way to eliminate moisture from washed blast furnace gas is to force it to impinge horizontally against vertical baffles placed at an angle to the movement of the gas and repeating this action until all the moisture is removed. The moisture collects in a film on these baffles and flows downwardly on their surfaces out of the path of the gas. The difficulty has been to design an apparatus which would perform these duties and yet not clog in operation. I have overcome this difficulty by making the entire surface of the baffles accessible to sprays which can be operated from the outside of the casing, permitting them to be flushed at intervals, and by providing free drainage at the bottom of the apparatus, allowing the water to flow off continuously without loss of gas and permitting any solids which may have collected to be drawn off intermittently through a suitable opening.

I have found that efficient drying is not possible on veins covered with a heavy flow of water. In fact such veins should not contain on their surfaces any water except that eliminated from the gas. I have discovered that a moist surface has more capillary attraction for the moisture of the gas than a wet surface. I, therefore, operate the drying stage without applying additional water, but arrange the apparatus in such a way that every surface in it can be washed off at intervals, preferably once a day, and that all accumulations of dirt are readily and automatically removed from the bottom of the apparatus by such flushing. I have also discovered that in order to effectively dry the gas, the velocity of flow of the same through the drier must be between certain definite limits. If the flow be too slow, the impinging action is lessened and not sufficient of the moisture is deposited on the veins. If it is too fast, too much moisture is carried along with the gas.

I preferably employ a cylindrical casing about twice the diameter of the gas pipes in which the blast furnace gas is usually conducted. This gives a velocity of not less than five (5) feet and not to exceed fifteen (15) feet per second in the open sections of the drier, which I have found to be the correct speed.

I have found that if all of the baffles in the drier are washed at one time, the gas will carry over a quantity of water to the detriment of the gas. For this reason I arrange the baffles in pairs, preferably providing three pairs, and providing sprays for each side of each pair. In operation, I prefer to spray these baffles in sequence. In that manner the water taken up by the gas during the spraying of all but the last pair of baffles, will be deposited on succeeding baffles before it leaves the casing. Inasmuch as the last set of baffles is the cleanest, this pair will require washing at longer intervals.

Apparatus similar to that shown herein, is first illustrated in my co-pending application, Serial No. 36,818 June 28, 1915.

The invention will be more readily understood by reference to the accompanying drawing, in which—

Figure 1 is a vertical longitudinal section through a drier such as contemplated by me, Fig. 2 is a vertical section on the line 2—2 of Fig. 1 and Fig. 3 is a fragmentary sectional plan view showing the arrangement of the vertical baffles in the casing.

Referring more particularly to the drawings, it will be seen that I provide a cylindrical casing 10 having a gas inlet 11 and a gas outlet 12. Arranged within the casing are three series of vertically-disposed baffles or slats, each series being composed of two rows of said baffles. The baffles or slats 13 are preferably composed of wood, and the slats of each pair are placed at an angle of substantially ninety degrees to each other, and at an angle of substantially forty-five degrees to the motion of the gas passing through the casing. The baffles are supported at their lower end on plates 14, suitably secured to the shell 10, and the lower portions of which plates are cut away as at 15 to provide for the escape of separated moisture. The moisture separated from the gas falls to the lower portion of the casing into the outlet portion 16, the lower portion of which is provided with a valve 17 by means of which the casing may be drained and any collected sediment or solid matter removed. The water drains off continuously through the gas seal pipe 18, which in its bend contains sufficient head of water to prevent any gas from escaping. The upper portion of the casing is provided with manholes 19 through which access may be gained to the casing as desired.

The gas in passing horizontally through the casing impinges the baffles, or slats, and the entrained moisture is deposited in a thin film on the surfaces of the baffles, from which it trickles downwardly and finally escapes from the casing. It will be noted that after the water is removed from the gas it does not again come in contact with the gas, but immediately leaves the path thereof without the opportunity of being again taken up. It has been found that a quantity of slime and very fine particles of solid matter accumulate on the baffles and, to provide for the cleaning thereof and the removal of this foreign matter without stopping the operation of the drier, I provide a series of spray nozzles 20, 21, 22, 23, so arranged as to completely flush the inside surface of all of the baffles. The water sprayed on the baffles flushes the solid matter therefrom and immediately leaves the path of the gas. If desired, additional sprays may be inserted through the manholes 19.

The baffles can be disposed in single or in multiple rows. I have used both arrangements and they have both proved efficient. The baffles I preferably make of wood, but galvanized iron and other materials can also be used to advantage. The slats can be straight, as shown on the drawing, or they may be bent to offer increased surface.

Modifications other than those referred to may be readily made by those skilled in the art and I do not, therefore, wish to be limited to the exact form shown and described.

I claim:

1. In a gas drier, the combination of a horizontal casing, a plurality of rows of vertically disposed baffles within said casing, the baffles of one row being disposed at an angle to the baffles of an adjacent row, and means for sequentially spraying said baffles to remove accumulations therefrom, whereby water taken up by the gas during the spraying of said baffles shall be deposited upon others of said baffles, substantially as described.

2. In a gas drier, the combination of a horizontally disposed casing, a plurality of rows of flat, vertically disposed baffles in said casing, said rows of baffles being arranged in pairs and the baffles of adjacent rows being arranged at right angles to each other and means for spraying each row of baffles, substantially as described.

3. In a gas drier, the combination of a horizontally disposed casing, a plurality of rows of flat, vertically disposed baffles in said casing, said rows of baffles being arranged in pairs and the baffles of adjacent rows being arranged at right angles to each other, and means for spraying said baffles to remove accumulated solids, substantially as described.

4. In a gas drier, the combination of a horizontally disposed casing, a plurality of rows of flat, vertically disposed baffles in said casing, said rows of baffles being arranged in pairs and the baffles of adjacent rows being arranged at right angles to each other, and means for sequentially spraying each pair of baffles, whereby water taken up by the gas during the spraying operation of one pair of baffles may be deposited on an adjacent pair of baffles, substantially as described.

5. In a gas drier, the combination of a horizontal casing having an inlet communicating with a gas main, a plurality of rows of vertically disposed baffles within said casing, said casing having an effective diameter substantially twice that of its inlet, to the end that the passage of gas through the casing shall be at a speed less than that at which the moisture will be carried along with the gas and greater than that at which no water is deposited on said baffles, substantially as described.

6. In a gas drier, the combination of a horizontal casing and a plurality of rows of straight-sided, vertically-disposed wooden baffles in said casing, the baffles of each row being disposed at an angle to the baffles of an adjacent row, and means for spraying each row of said baffles at intervals, substantially as described.

Signed at Chicago, Ill., this 25th day of September A. D. 1915.

HERMANN A. BRASSERT.

Witnesses:
D. V. MEDALIR,
J. A. McMILLAN.